(12) United States Patent
Chang

(10) Patent No.: US 7,656,580 B2
(45) Date of Patent: *Feb. 2, 2010

(54) LIGHT DIFFUSING SHEET WITH TWO KINDS OF LIGHT DIFFUSION PARTICLES

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 328 days.

This patent is subject to a terminal disclaimer.

(21) Appl. No.: 11/565,557

(22) Filed: Nov. 30, 2006

(65) Prior Publication Data

US 2008/0030860 A1    Feb. 7, 2008

(30) Foreign Application Priority Data

Aug. 4, 2006    (CN) .................. 2006 1 0061988

(51) Int. Cl.
*G03B 21/60* (2006.01)

(52) U.S. Cl. ...................................... 359/452; 359/453

(58) Field of Classification Search ......... 359/452–453, 359/599; 362/330, 332; 353/79
See application file for complete search history.

(56) References Cited

U.S. PATENT DOCUMENTS

| 6,217,176 | B1 |   | 4/2001 | Maekawa |
| 6,747,796 | B1 | * | 6/2004 | Dorling ....................... 359/452 |
| 6,852,376 | B2 | * | 2/2005 | Chien et al. .................. 428/1.3 |
| 6,871,994 | B2 | * | 3/2005 | Harada et al. ................ 362/558 |
| 7,190,517 | B2 | * | 3/2007 | Abe et al. .................... 359/457 |
| 7,213,923 | B2 | * | 5/2007 | Liu et al. ....................... 353/31 |
| 7,513,655 | B2 | * | 4/2009 | Chang ......................... 362/332 |

* cited by examiner

*Primary Examiner*—Christopher Mahoney
(74) *Attorney, Agent, or Firm*—Clifford O. Chi

(57) ABSTRACT

A light diffusing sheet (21) including a main body. The main body is made of a transparent resin matrix material (211), and a plurality of first light diffusion particles (212) and a plurality of second light diffusion particles (213) dispersed in the transparent resin matrix material uniformly. A refractive index of the second light diffusion particles is greater than that of the first light diffusion particles. The light diffusing sheet has improved light diffusing capability.

12 Claims, 5 Drawing Sheets

LIGHT DIFFUSING SHEET WITH TWO KINDS OF LIGHT DIFFUSION PARTICLES

BACKGROUND OF THE INVENTION

1. Field of the Invention

The present invention relates to light diffusing sheets, and more particularly to a light diffusing sheet for use in, for example, a liquid crystal display (LCD).

2. Discussion of the Related Art

In a liquid crystal display, liquid crystal is a substance that does not itself radiate light. Instead, the liquid crystal relies on light received from a light source in order to provide displaying of images and data. In the case of a typical liquid crystal display, a backlight module powered by electricity supplies the needed light.

For improving a uniformity of brightness of output light, the backlight module generally needs a diffusing sheet. Referring to FIG. 1, a typical light diffusing sheet 10 is shown. The light diffusing sheet 10 includes a light diffusing layer 11 and a transparent plate 12. The light diffusing layer 11 has a matrix material 111, and a multiplicity of light diffusion particles 112 dispersed in the matrix material 111. The matrix material 111 is one of polycarbonate, polymethyl methacrylate, and polyester. The light diffusion particles 112 are polypropylene particles or glass beads, which are used for diffusing light that passes through the light diffusing sheet 10.

However, a difference between a refractive index of the matrix material 111 and a refractive index of the light diffusing particles 112 is small. This means the optical properties of the light diffusion particles 112 may be rather weak. For example, when an intensity of incident light varies significantly over different areas of the light diffusing sheet 10, the light diffusing particles 112 may not be able to sufficiently diffuse the light in order to output uniformly bright light from the light diffusing sheet 10. When this happens, a plurality of dark areas and/or a plurality of bright areas appear on an output surface of the light diffusing sheet 10.

Therefore, what is needed is to provide a new light diffusing sheet having improved light diffusing capability.

SUMMARY

A light diffusing sheet according to a preferred embodiment includes a main body. The main body is made of a transparent resin matrix material, and a plurality of first light diffusion particles and a plurality of second light diffusion particles dispersed in the transparent resin matrix material uniformly. A refractive index of the second light diffusion particles is greater than that of the first light diffusion particles.

Other advantages and novel features will become more apparent from the following detailed description of preferred embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present light diffusing sheet. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present light diffusing sheet in detail.

Figure 1:
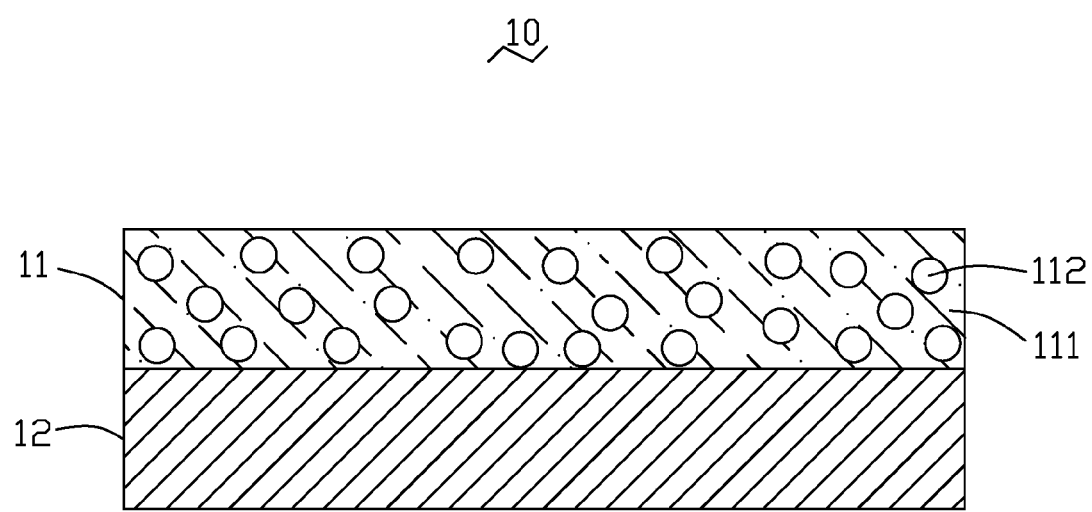
FIG. 1 is a side cross-sectional view of a conventional light diffusing sheet.
Figure 2:
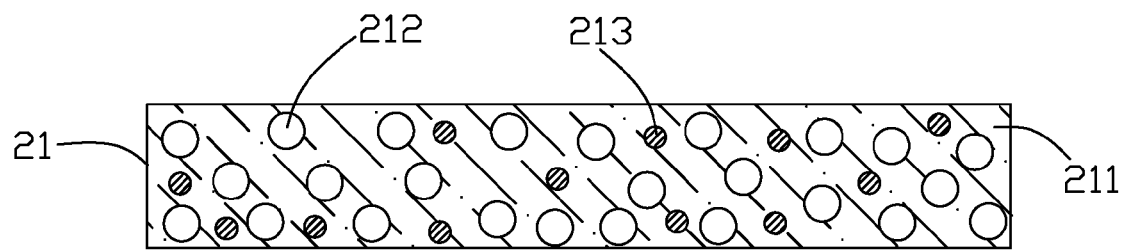
FIG. 2 is a side cross-sectional view of a light diffusing sheet according to a first preferred embodiment of the present invention.

Referring to FIG. 2, a light diffusing sheet 21 according to a first preferred embodiment of the present invention is shown. The light diffusing sheet 21 includes a transparent resin matrix material 211, a multiplicity of first light diffusion particles 212, and a multiplicity of second light diffusion particles 213. The first diffusion particles 212 and the second particles 213 are dispersed in the transparent resin matrix material 211 uniformly. A refractive index of the second light diffusion particles 213 is greater than that of the first light diffusion particles 212. Typically, the light diffusing sheet 21 includes the transparent resin matrix material 211 in an amount by weight in the range from 5% to 90%, the first light diffusion particles 212 and second light diffusion particles 213 in a combined amount by weight in the range from 10% to 95%. A ratio by weight of the first light diffusion particles 212 to the second light diffusion particles 213 is typically in the range from 5 to 100.

The transparent resin matrix material 211 can be selected from the group consisting of acrylic resin, acrylic amino resin, epoxy resin, and any suitable combination thereof. The refractive index of the first light diffusion particles 212 can be in the range from about 1.4 to about 1.7. The refractive index of the second light diffusion particles 213 can be greater than 2.0. Preferably, the refractive index of the second light diffusion particles 213 is in the range from about 2.0 to about 2.8. The first light diffusion particles 212 can be selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof. The second light diffusion particles 213 can be selected from the group consisting of titanium dioxide particles, barium sulfate particles, zinc sulfide particles, zinc oxide particles, antimony oxide particles, calcium carbonate particles, and any combination thereof. According to one aspect of the first preferred embodiment, for reducing loss of light energy, an average size of the first light diffusion particles 212 is larger than that of the second light diffusion particles 213. For example, the average size of the first light diffusion particles 212 can be in the range from about 1 micrometer to about 50 micrometers, and the average size of the second light diffusion particles 213 can be in the range from about 0.01 micrometers to about 1 micrometer.

When light enters the light diffusing sheet 21, the first light diffusion particles 212 substantially diffuse the light rays. The second light diffusion particles 213 may further diffract and reflect the light rays due to their smaller sizes and greater refractive index(es) compared to the first light diffusion particles 212. Thus the light diffusing sheet 21 can have good light diffusion capability with the cooperative effects of the first light diffusion particles 212 and the second light diffusion particles 213.

Figure 3:
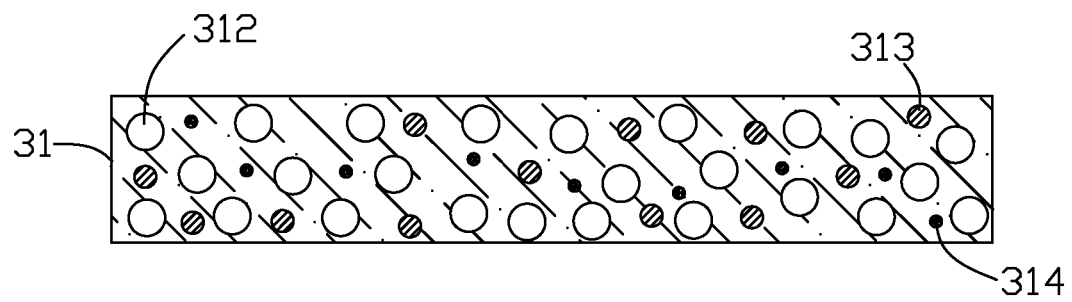
FIG. 3 is a side cross-sectional view of a light diffusing sheet according to a second preferred embodiment of the present invention.

Referring to FIG. 3, a light diffusing sheet 31 according to a second preferred embodiment of the present invention is shown. The light diffusing sheet 31 is similar in principle to the light diffusing sheet 21 of the first embodiment. The light diffusing sheet 31 includes first and second light diffusion particles 312, 313, and further includes a multiplicity of fluorescent particles 314. Typically, a ratio by weight of the first light diffusion particles 312 to the fluorescent particles 314 is greater than 100. The fluorescent particles 314 are used to convert ultraviolet light into visible light. This further enhances a light energy utilization ratio of the light diffusing sheet 31. Additionally, the fluorescent particles 314 help prevent the light diffusing sheet 31 from undergoing unwanted color change due to the effects of long-term irradiation by ultraviolet light.

Figure 4:
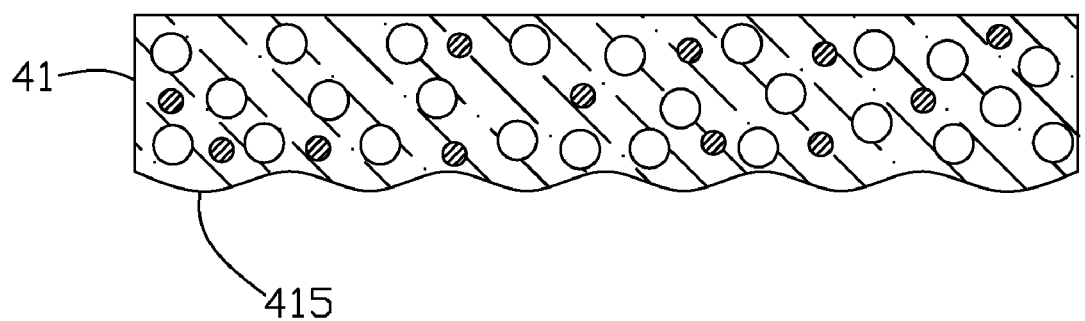
FIG. 4 is a side cross-sectional view of a light diffusing sheet according to a third preferred embodiment of the present invention.

Referring to FIG. 4, a light diffusing sheet 41 according to a third preferred embodiment of the present invention is shown. The light diffusing sheet 41 is similar in principle to the light diffusing sheet 21 of the first embodiment. However, the light diffusing sheet 41 further includes a plurality of protrusions 415 at a bottom light input surface thereof. The plurality of protrusions 415 are arranged to correspond to a same plurality of light sources. In use, when light emitted by the light sources enters the light diffusing sheet 41, high intensity portions of the light are diffused by the protrusions 415. That is, the protrusions 415 provide diffusing of light in addition to that provided by the first and second light diffusion particles. Thus the optical properties of the light diffusing sheet 41 may be further improved.

Figure 5:
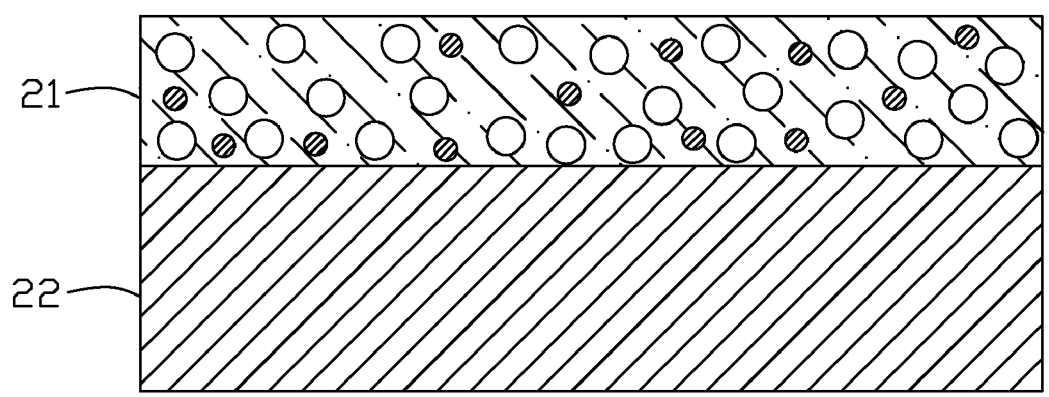
FIG. 5 is a side cross-sectional view of a light diffusing sheet according to a fourth preferred embodiment of the present invention.

In addition, to improve a structural strength of the light diffusing sheet 21, a transparent sheet 22 may be provided on a surface of the light diffusing sheet 21, as shown in FIG. 5. The transparent sheet 22 can be made of material selected from the group consisting of polycarbonate, polymethyl methacrylate, polystyrene, methyl methacrylate and styrene copolymer, and any suitable combination thereof. A thickness of the transparent sheet 22 is generally less than 6 millimeters.

It is noted that the scope of the present light diffusing sheet is not limited to the above-described embodiments. For example, the structural strength of the light diffusing sheet 21 can be improved without the use of the transparent sheet 22. Instead, a thickness of the light diffusing sheet 21 can be configured to provide the light diffusing sheet 21 with increased structural strength.

Further, while various preferred and exemplary embodiments have been described above, the embodiments can be further modified within the spirit and scope of this disclosure. This application is intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A light diffusing sheet comprising a main body made of a transparent resin matrix material, a plurality of first light diffusion particles, a plurality of second light diffusion particles, and a plurality of fluorescent particles dispersed in the transparent resin matrix material uniformly, wherein a refractive index of the second light diffusion particles is greater than that of the first light diffusion particles; the main body comprises the transparent resin matrix material in an amount by weight in the range from 5% to 90%, and the first and second light diffusion particles in a combined amount by weight in the range from 10% to 95%; a ratio by weight of the first light diffusion particles to the second light diffusion particles is in the range from 5 to 100; and a ratio by weight of the first light diffusion particles to the fluorescent particles is greater than 100.

2. The light diffusing sheet according to claim 1, wherein the transparent resin matrix material is selected from the group consisting of acrylic resin, acrylic amino resin, epoxy resin, and any combination thereof.

3. The light diffusing sheet according to claim 1, wherein a refractive index of the first light diffusion particles is in the range from about 1.4 to about 1.7, and a refractive index of the second light diffusion particles is greater than about 2.0.

4. The light diffusing sheet according to claim 3, wherein the refractive index of the second light diffusion particles is in the range from about 2.0 to about 2.8.

5. The light diffusing sheet according to claim 1, wherein the first light diffusion particles are selected from the group consisting of polystyrene particles, polycarbonate particles, styrene acrylonitrile copolymer particles, polypropylene particles, polymethyl methacrylate particles, glass beads, silicon dioxide particles, quartz particles, and any combination thereof.

6. The light diffusing sheet according to claim 1, wherein the second light diffusion particles are selected from the group consisting of titanium dioxide particles, barium sulfate particles, zinc sulfide particles, zinc oxide particles, antimony oxide particles, calcium carbonate particles, and any combination thereof.

7. The light diffusing sheet according to claim 1, wherein an average size of the first light diffusion particles is larger than that of the second light diffusion particles.

8. The light diffusing sheet according to claim 7, wherein the average size of the first light diffusion particles is in the range from about 1 micrometer to about 50 micrometers, and the average size of the second light diffusion particles is in the range from about 0.01 micrometers to about 1 micrometer.

9. The light diffusing sheet according to claim 1, wherein the main body comprises a light input surface, and the main body has a plurality of protrusions formed at the light input surface.

10. The light diffusing sheet according to claim 1, further comprising a transparent sheet portion adjoining a surface of the main body.

11. The light diffusing sheet according to claim 10, wherein the transparent sheet portion is made of material selected from the group consisting of polycarbonate, polymethyl methacrylate, polystyrene, methyl methacrylate and styrene copolymer, and any combination thereof.

12. The light diffusing sheet according to claim 10, wherein a thickness of the transparent sheet is less than about 6 millimeters.

* * * * *

UNITED STATES PATENT AND TRADEMARK OFFICE
CERTIFICATE OF CORRECTION

| | |
|---|---|
| PATENT NO. | : 7,656,580 B2 |
| APPLICATION NO. | : 11/565557 |
| DATED | : February 2, 2010 |
| INVENTOR(S) | : Shao-Han Chang |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Thirtieth Day of November, 2010

David J. Kappos
*Director of the United States Patent and Trademark Office*